US012372366B2

(12) United States Patent
Saxena et al.

(10) Patent No.: US 12,372,366 B2
(45) Date of Patent: Jul. 29, 2025

(54) LANE CHANGES FOR AUTONOMOUS VEHICLES INVOLVING TRAFFIC STACKS AT INTERSECTION

(71) Applicant: Waymo LLC, Mountain View, CA (US)

(72) Inventors: Alisha Saxena, San Francisco, CA (US); Cheng Zhou, Sunnyvale, CA (US); Romain Thibaux, Fremont, CA (US); Ryan De Iaco, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 397 days.

(21) Appl. No.: 17/849,936

(22) Filed: Jun. 27, 2022

(65) Prior Publication Data

US 2023/0417565 A1 Dec. 28, 2023

(51) Int. Cl.
*G01C 21/34* (2006.01)
*B60W 60/00* (2020.01)

(52) U.S. Cl.
CPC ..... *G01C 21/3492* (2013.01); *B60W 60/0027* (2020.02)

(58) Field of Classification Search
CPC .......... G01C 21/3492; B60W 60/0027; B60W 2554/406; B60W 30/18154;
(Continued)

(56) References Cited

U.S. PATENT DOCUMENTS

| 4,814,765 A | * | 3/1989 | DeRoche | G08G 1/096 340/911 |
| 4,878,050 A | * | 10/1989 | Kelley | B60R 25/04 307/10.6 |

(Continued)

FOREIGN PATENT DOCUMENTS

| CN | 102481931 A | * | 5/2012 | ............ B60W 30/12 |
| CN | 113928341 A | * | 1/2022 | .......... B60W 60/001 |

(Continued)

OTHER PUBLICATIONS

"AutonoVi: Autonomous vehicle planning with dynamic maneuvers and traffic constraints;" Best et al., 2017 IEEE/RSJ International Conference on Intelligent Robots and Systems (IROS) (2017, pp. 2629-2636); Sep. 1, 2017 (Year: 2017).*

(Continued)

*Primary Examiner* — Khoi H Tran
*Assistant Examiner* — Jorge O Peche
(74) *Attorney, Agent, or Firm* — Botos Churchill IP Law

(57) ABSTRACT

Aspects of the disclosure provide for controlling an autonomous vehicle. For instance, one or more processors of one or more first systems of the autonomous vehicles may receive a signal indicating a predicted traffic stack for a lane in which the autonomous vehicle is currently traveling. In response to the received signal, costs of edges of a roadgraph between the autonomous vehicle and a location of the predicted traffic stack may be adjusted in order to encourage the autonomous vehicle to change lanes in response to the predicted traffic stack. A route may be generated to a destination based on at least one of the adjusted costs. The route may be provided to one or more second systems of the autonomous vehicle in order to control the autonomous vehicle according to the route.

20 Claims, 9 Drawing Sheets

(58) Field of Classification Search
CPC ..... B60W 30/18159; B60W 30/18163; B60W
50/0097; B60W 60/0011; B60W 60/001;
G08G 1/096725; G08G 1/096844; G08G
1/167
See application file for complete search history.

(56) References Cited

U.S. PATENT DOCUMENTS

| | | | |
|---|---|---|---|
| 5,369,591 A | 11/1994 | Broxmeyer | |
| 5,633,629 A * | 5/1997 | Hochstein | G08G 1/096783 |
| | | | 398/1 |
| 6,169,940 B1 | 1/2001 | Jitsukata et al. | |
| 6,269,304 B1 | 7/2001 | Kaji et al. | |
| 6,385,539 B1 | 5/2002 | Wilson et al. | |
| 7,804,423 B2 | 9/2010 | Mudalige et al. | |
| 7,805,442 B1 | 9/2010 | Joshi et al. | |
| 7,930,095 B2 | 4/2011 | Lee | |
| 8,078,379 B2 * | 12/2011 | Lu | G08G 1/096758 |
| | | | 340/917 |
| 8,155,868 B1 | 4/2012 | Xing et al. | |
| 8,335,641 B2 | 12/2012 | Nakayama et al. | |
| 8,559,673 B2 * | 10/2013 | Fairfield | G06V 20/584 |
| | | | 382/104 |
| 8,665,079 B2 * | 3/2014 | Pawlicki | G01S 13/867 |
| | | | 340/436 |
| 9,096,267 B2 | 8/2015 | Mudalige et al. | |
| 9,146,127 B2 | 9/2015 | Bank et al. | |
| 9,404,761 B2 | 8/2016 | Meuleau | |
| 9,405,293 B2 | 8/2016 | Meuleau | |
| 9,428,187 B2 | 8/2016 | Lee | |
| 9,623,905 B2 | 4/2017 | Shashua et al. | |
| 9,656,673 B2 | 5/2017 | Clarke et al. | |
| 9,672,734 B1 | 6/2017 | Ratnasingam | |
| 9,707,960 B2 * | 7/2017 | Gutmann | G08G 1/09623 |
| 9,792,508 B2 | 10/2017 | Kawasaki et al. | |
| 9,892,296 B2 | 2/2018 | Kovarik et al. | |
| 9,940,834 B1 | 4/2018 | Konrardy et al. | |
| 9,964,414 B2 | 5/2018 | Slavin et al. | |
| 10,078,770 B2 | 9/2018 | Kovarik et al. | |
| 10,126,136 B2 | 11/2018 | Iagnemma | |
| 10,156,845 B1 | 12/2018 | Greenberger et al. | |
| 10,248,120 B1 | 4/2019 | Siegel et al. | |
| 10,309,792 B2 | 6/2019 | Iagnemma | |
| 10,331,129 B2 | 6/2019 | Iagnemma et al. | |
| 10,365,110 B2 * | 7/2019 | Alesiani | G01C 21/20 |
| 10,379,533 B2 * | 8/2019 | Bier | G05D 1/0257 |
| 10,431,095 B2 | 10/2019 | Jain et al. | |
| 10,473,470 B2 | 11/2019 | Iagnemma et al. | |
| 10,609,148 B1 * | 3/2020 | Tran | G06Q 50/40 |
| 10,681,513 B2 | 6/2020 | Jagnemma et al. | |
| 10,696,299 B2 | 6/2020 | Weldemariam et al. | |
| 10,800,416 B2 | 10/2020 | Aine | |
| 10,857,994 B2 | 12/2020 | Iagnemma et al. | |
| 10,867,139 B2 | 12/2020 | Kovarik et al. | |
| 10,909,866 B2 * | 2/2021 | Jacobus | G05D 1/646 |
| 10,992,755 B1 * | 4/2021 | Tran | G01S 13/88 |
| 11,092,446 B2 | 8/2021 | Iagnemma | |
| 11,097,735 B1 | 8/2021 | Marasigan et al. | |
| 11,186,276 B2 * | 11/2021 | Tao | G05D 1/0223 |
| 11,360,475 B2 | 6/2022 | Abrams et al. | |
| 11,480,971 B2 * | 10/2022 | Isele | G06N 3/048 |
| 11,715,305 B1 * | 8/2023 | Mandava | G06V 10/267 |
| 11,904,889 B1 * | 2/2024 | Lumb | B60W 30/143 |
| 12,187,316 B2 * | 1/2025 | Sheth | B60W 60/0015 |
| 2001/0013837 A1 | 8/2001 | Yamashita et al. | |
| 2001/0049582 A1 | 12/2001 | Sakashita | |
| 2002/0030611 A1 | 3/2002 | Nuesser et al. | |
| 2002/0198632 A1 | 12/2002 | Breed et al. | |
| 2004/0107030 A1 * | 6/2004 | Nishira | B60W 50/08 |
| | | | 348/148 |
| 2005/0125125 A1 * | 6/2005 | Matsumoto | B60T 8/1755 |
| | | | 701/41 |
| 2006/0220913 A1 * | 10/2006 | Krautter | G08G 1/096791 |
| | | | 340/933 |
| 2007/0046063 A1 * | 3/2007 | Dempsey | B60J 11/00 |
| | | | 296/136.1 |
| 2007/0106470 A1 | 5/2007 | Nakayama et al. | |
| 2007/0124072 A1 * | 5/2007 | Nakayama | G01C 21/3658 |
| | | | 340/995.19 |
| 2007/0257817 A1 * | 11/2007 | Mahoney | G09F 19/22 |
| | | | 340/929 |
| 2008/0033632 A1 | 2/2008 | Lee | |
| 2008/0107027 A1 * | 5/2008 | Allan | H04L 45/50 |
| | | | 370/235 |
| 2008/0170754 A1 * | 7/2008 | Kawasaki | G06V 20/584 |
| | | | 382/104 |
| 2009/0309757 A1 | 12/2009 | Mudalige et al. | |
| 2011/0169958 A1 | 7/2011 | Imai et al. | |
| 2012/0053755 A1 * | 3/2012 | Takagi | G01S 7/4808 |
| | | | 701/1 |
| 2012/0296539 A1 | 11/2012 | Cooprider et al. | |
| 2013/0103258 A1 | 4/2013 | Evaldsson et al. | |
| 2013/0253754 A1 * | 9/2013 | Ferguson | G05D 1/0231 |
| | | | 701/28 |
| 2013/0275033 A1 | 10/2013 | Bastiaensen et al. | |
| 2013/0282264 A1 | 10/2013 | Bastiaensen et al. | |
| 2014/0025201 A1 | 1/2014 | Ryu et al. | |
| 2014/0032017 A1 | 1/2014 | Anderson et al. | |
| 2014/0046509 A1 * | 2/2014 | Otake | G08G 1/096775 |
| | | | 701/2 |
| 2014/0046581 A1 * | 2/2014 | Ota | G08G 1/09626 |
| | | | 701/408 |
| 2014/0207325 A1 | 7/2014 | Mudalige et al. | |
| 2014/0278052 A1 | 9/2014 | Slavin et al. | |
| 2014/0358420 A1 * | 12/2014 | Noh | G01C 21/28 |
| | | | 701/409 |
| 2015/0057907 A1 * | 2/2015 | Rebhan | B60W 30/143 |
| | | | 701/1 |
| 2015/0142207 A1 | 5/2015 | Flehmig et al. | |
| 2015/0194055 A1 * | 7/2015 | Maass | G08G 1/096716 |
| | | | 340/905 |
| 2015/0197248 A1 * | 7/2015 | Breed | G08G 1/096775 |
| | | | 340/905 |
| 2015/0241232 A1 | 8/2015 | Park et al. | |
| 2015/0345966 A1 | 12/2015 | Meuleau | |
| 2015/0345967 A1 | 12/2015 | Meuleau | |
| 2015/0353082 A1 | 12/2015 | Lee et al. | |
| 2015/0353085 A1 | 12/2015 | Lee | |
| 2016/0098496 A1 | 4/2016 | Joshi et al. | |
| 2017/0021864 A1 | 1/2017 | Sonntag et al. | |
| 2017/0031361 A1 | 2/2017 | Olson et al. | |
| 2017/0043780 A1 | 2/2017 | Yoon | |
| 2017/0192436 A1 | 7/2017 | Min et al. | |
| 2017/0213466 A1 | 7/2017 | Azar | |
| 2017/0219353 A1 * | 8/2017 | Alesiani | G05D 1/0212 |
| 2017/0227966 A1 | 8/2017 | Monzen et al. | |
| 2017/0320521 A1 | 11/2017 | Fujita | |
| 2018/0073887 A1 * | 3/2018 | Okada | B62D 15/021 |
| 2018/0113450 A1 * | 4/2018 | Sherony | B60W 30/18163 |
| 2018/0201148 A1 | 7/2018 | Donnelly et al. | |
| 2018/0215803 A1 * | 8/2018 | Devi | H04L 67/52 |
| 2018/0292824 A1 | 10/2018 | Kazemi et al. | |
| 2019/0004527 A1 * | 1/2019 | Fairfield | G08G 1/096833 |
| 2019/0080266 A1 | 3/2019 | Zhu et al. | |
| 2019/0086226 A1 | 3/2019 | Hamada et al. | |
| 2019/0092570 A1 | 3/2019 | MacDonald et al. | |
| 2019/0102840 A1 | 4/2019 | Perl et al. | |
| 2019/0171206 A1 * | 6/2019 | Abrams | G05D 1/0088 |
| 2019/0179336 A1 * | 6/2019 | Colijn | G05D 1/0291 |
| 2019/0186936 A1 * | 6/2019 | Ebner | G01C 21/3492 |
| 2019/0208695 A1 * | 7/2019 | Graf Plessen | A01B 69/008 |
| 2019/0258251 A1 | 8/2019 | Ditty et al. | |
| 2019/0287404 A1 * | 9/2019 | Vernaza | G08G 1/0145 |
| 2019/0291728 A1 | 9/2019 | Shalev-Shwartz et al. | |
| 2019/0295179 A1 | 9/2019 | Shalev-Shwartz et al. | |
| 2019/0310627 A1 | 10/2019 | Halder | |
| 2019/0311612 A1 * | 10/2019 | Johnson | G08G 1/052 |
| 2020/0026935 A1 * | 1/2020 | Hayashi | G06V 20/582 |
| 2020/0031340 A1 * | 1/2020 | Tao | G05D 1/0223 |
| 2020/0047771 A1 * | 2/2020 | Yoon | B60W 60/001 |
| 2020/0057453 A1 * | 2/2020 | Laws | G05D 1/0088 |
| 2020/0110414 A1 | 4/2020 | Dupre et al. | |

(56) References Cited

U.S. PATENT DOCUMENTS

| | | | |
|---|---|---|---|
| 2020/0180647 A1* | 6/2020 | Anthony | G08G 1/0125 |
| 2020/0234582 A1* | 7/2020 | Mintz | G08G 1/096811 |
| 2020/0249677 A1* | 8/2020 | Maat | G06N 3/047 |
| 2020/0326203 A1* | 10/2020 | Lund | G08G 1/04 |
| 2020/0331435 A1* | 10/2020 | Dingli | B60S 1/56 |
| 2020/0385024 A1* | 12/2020 | Wongpiromsarn | B60W 60/0015 |
| 2021/0053572 A1* | 2/2021 | Vasoya | B60W 40/04 |
| 2021/0082297 A1* | 3/2021 | Jacobus | B60W 30/09 |
| 2021/0163011 A1* | 6/2021 | Maru | G08G 1/167 |
| 2021/0188275 A1* | 6/2021 | Matsumura | B60W 60/0053 |
| 2021/0201051 A1* | 7/2021 | Deselaers | G06N 7/01 |
| 2021/0256849 A1* | 8/2021 | Peranadam | G08G 1/162 |
| 2021/0287024 A1* | 9/2021 | Taki | B60W 40/04 |
| 2021/0347382 A1 | 11/2021 | Huang et al. | |
| 2021/0354730 A1* | 11/2021 | Anthony | B60W 40/04 |
| 2021/0357662 A1* | 11/2021 | Hartmann | G06F 18/40 |
| 2021/0364305 A1* | 11/2021 | Rizk | G01C 21/3605 |
| 2022/0176987 A1* | 6/2022 | Russell | G06V 20/582 |
| 2022/0229436 A1 | 7/2022 | Abrams et al. | |
| 2022/0340149 A1* | 10/2022 | Nister | B60W 60/001 |
| 2022/0348227 A1* | 11/2022 | Foster | B60Q 1/507 |
| 2022/0410937 A1* | 12/2022 | Parasuram | G05D 1/0214 |
| 2023/0030104 A1* | 2/2023 | Puchkarev | B60W 60/0027 |
| 2023/0047336 A1* | 2/2023 | Iglesias | B60W 60/00272 |
| 2023/0154200 A1* | 5/2023 | Gong | G06V 20/584 345/419 |
| 2023/0176577 A1* | 6/2023 | Ditty | G06V 20/588 701/23 |
| 2023/0227065 A1* | 7/2023 | Vora | B60W 60/0011 701/23 |
| 2023/0294598 A1* | 9/2023 | Morimura | B60Q 1/525 340/435 |
| 2023/0417565 A1* | 12/2023 | Saxena | B60W 30/18154 |
| 2024/0010233 A1* | 1/2024 | Sheth | G06V 20/584 |
| 2024/0067174 A1* | 2/2024 | Adam | B60W 60/0015 |
| 2024/0290109 A1* | 8/2024 | Zhou | G06V 20/582 |

FOREIGN PATENT DOCUMENTS

| | | | | |
|---|---|---|---|---|
| CN | 110546461 B | * | 5/2022 | B60K 31/00 |
| CN | 117315970 A | * | 12/2023 | B60W 30/18018 |
| EP | 3342666 A1 | | 7/2018 | |
| EP | 4306382 A1 | * | 1/2024 | B60W 60/001 |
| JP | 2006105686 A | | 4/2006 | |
| JP | 2016017914 A | | 2/2016 | |
| JP | 2016075905 A | | 5/2016 | |
| JP | 2017090301 A | | 5/2017 | |
| JP | 2017142145 A | | 8/2017 | |
| KR | 101252015 B1 | | 4/2013 | |
| KR | 20150058030 A | | 5/2015 | |
| KR | 20150128712 A | * | 11/2015 | |
| WO | WO-03093857 A2 | * | 11/2003 | B60K 31/0008 |
| WO | 2017168662 A1 | | 10/2017 | |
| WO | WO-2018142194 A1 | * | 8/2018 | G06N 7/08 |
| WO | WO-2019206860 A1 | * | 10/2019 | B60W 30/0956 |
| WO | 2020245769 A1 | | 12/2020 | |

OTHER PUBLICATIONS

"The OPA3L System and Testconcept for Urban Autonomous Driving;" Folkers et al., 2022 IEEE 25th International Conference on Intelligent Transportation Systems (ITSC) (2022, pp. 1949-1956); Oct. 8, 2022. (Year: 2022).*

"Autonomous Vehicle Lane Change Maneuver: A Comprehensive Analysis;" Paul et al., 2024 International Conference on Intelligent and Innovative Technologies in Computing, Electrical and Electronics (IITCEE) (2024, pp. 1-6); Jan. 24, 2024. (Year: 2024).*

Notice of Preliminary Rejection for Korean Patent Application No. 10-2020-7015985, Nov. 1, 2021.

Notice of Reasons for Rejection for Japanese Patent Application No. 2020-529291, Sep. 3, 2021.

The Extended European Search Report for European Patent Application No. 18885764.3 dated Jul. 9, 2021.

"International Search Report and Written Opinion for Application No. PCT/US2018/059225 dated Feb. 28, 2019", 10 pages.

Extended European Search Report for corresponding European Patent Application No. 23165667.9 dated Nov. 6, 2023 (9 pages).

* cited by examiner

LANE CHANGES FOR AUTONOMOUS VEHICLES INVOLVING TRAFFIC STACKS AT INTERSECTION

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories that maneuver through the surroundings.

BRIEF SUMMARY

Aspects of the disclosure provide a method for controlling an autonomous vehicle. The method includes receiving, by one or more processors of one or more first systems of the autonomous vehicles, a signal indicating a predicted traffic stack for a lane in which the autonomous vehicle is currently traveling; in response to the received signal, adjusting, by the one or more processors, costs of edges of a roadgraph between the autonomous vehicle and a location of the predicted traffic stack in order to encourage the autonomous vehicle to change lanes in response to the predicted traffic stack; generating, by the one or more processors, a route to a destination based on at least one of the adjusted costs; and providing, by the one or more processors, the route to one or more second systems of the autonomous vehicle in order to control the autonomous vehicle according to the route.

In one example, the predicted traffic stack is located at an intersection. In another example, the one or more first systems is a planning system of the autonomous vehicle configured to generate trajectories according to the route for the autonomous vehicle to follow. In another example, the one or more second systems include a routing system of the autonomous vehicle configured to generate the route. In another example, adjusting the costs includes increasing the costs. In another example, the edges correspond to the lane. In another example, the method also includes receiving a second signal indicating a second predicted traffic stack in a second lane adjacent to the lane, and in response to the received second signal, adjusting second costs of second edges of the roadgraph in the second lane. In this example, generating the route is further based on at least one of the adjusted second costs. In addition, the second signal further indicates which of the predicted traffic stack and the second predicted traffic stack is a worse traffic stack, and adjusting the edges and adjusting the second edges is further based on which of the predicted traffic stack and the second predicted traffic stack is a worse traffic stack.

Another aspect of the disclosure provides a system for controlling an autonomous vehicle. The system includes one or more processors configured to receive a signal indicating a predicted traffic stack for a lane in which the autonomous vehicle is currently traveling; in response to the received signal, adjust costs of edges of a roadgraph between the autonomous vehicle and a location of the predicted traffic stack in order to encourage the autonomous vehicle to change lanes in response to the predicted traffic stack; generate a route to a destination based on at least one of the adjusted costs; and provide the route to one or more second systems of the autonomous vehicle in order to control the autonomous vehicle according to the route.

In one example, the predicted traffic stack is located at an intersection. In another example, the system is a planning system of the autonomous vehicle configured to generate trajectories according to the route for the autonomous vehicle to follow. In another example, the system also includes the one or more second systems, wherein the one or more second systems include a routing system of the autonomous vehicle configured to generate the route. In another example, the one or more processors are further configured to adjust the costs includes increasing the costs. In another example, the edges correspond to the lane. In another example, the one or more processors are further configured to receive a second signal indicating a second predicted traffic stack in a second lane adjacent to the lane, and in response to the received second signal, adjust second costs of second edges of the roadgraph in the second lane, and wherein generating the route is further based on at least one of the adjusted second costs. In this example, the second signal further indicates which of the predicted traffic stack and the second predicted traffic stack is a worse traffic stack, and the one or more processors are further configured to adjust the edges and adjust the second edges further based on which of the predicted traffic stack and the second predicted traffic stack is a worse traffic stack.

A further aspect of the disclosure provides an autonomous vehicle comprising: memory storing a roadgraph and a planning system comprising one or more processors. The one or more processors are configured to receive a signal indicating a predicted traffic stack for a lane in which the autonomous vehicle is currently traveling; in response to the received signal, adjust costs of edges of a roadgraph between the autonomous vehicle and a location of the predicted traffic stack in order to encourage the autonomous vehicle to change lanes in response to the predicted traffic stack; generate a route to a destination based on at least one of the adjusted costs; and provide the route to one or more second systems of the autonomous vehicle in order to control the autonomous vehicle according to the route.

In one example, the system also includes the one or more second systems. In another example, the one or more second systems include a routing system of the autonomous vehicle configured to generate the route. In another example, the one or more processors are further configured to receive a second signal indicating a second predicted traffic stack in a second lane adjacent to the lane, and in response to the received second signal, adjusting second costs of second edges of the roadgraph in the second lane, and wherein generating the route is further based on at least one of the adjusted second costs.

DETAILED DESCRIPTION

Overview

Figure 1:
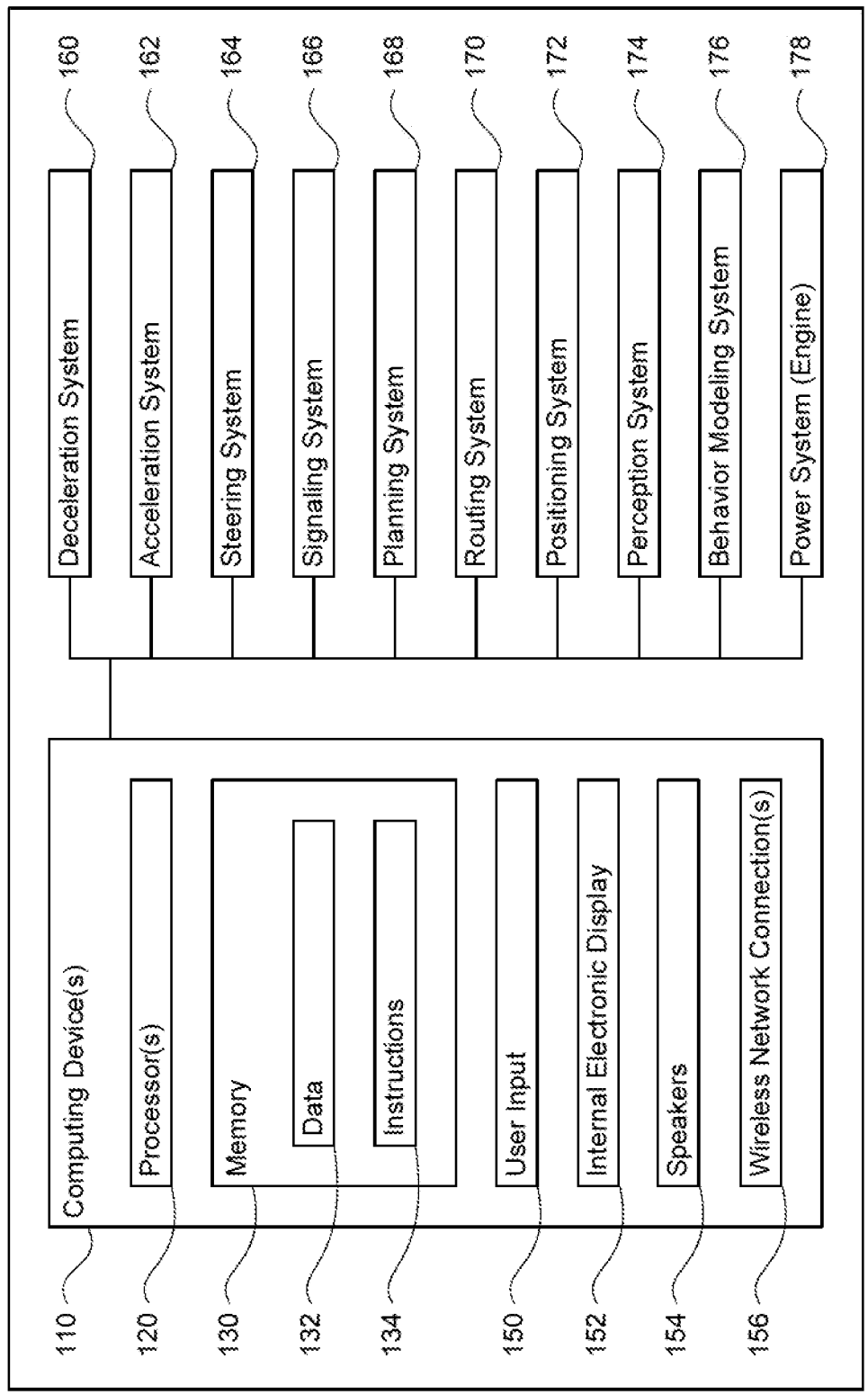
FIG. 1 is a functional diagram of an example vehicle in accordance with an exemplary embodiment.

The technology relates to responding to stacked vehicles, and in particular, stacked vehicles at traffic intersections. For example, as an autonomous vehicle approaches an intersection, the autonomous vehicle's planning system must determine whether to stop before entering the intersection. This decision can be made not only upon the status of any traffic signals, but also whether traffic within the intersection would prevent the autonomous vehicle from exiting the intersection. Such traffic may include, for example, a line of stopped vehicles in the same lane. These vehicles may be considered a traffic stack. When a traffic stack is predicted at an intersection, the autonomous vehicle's computing devices may take action to encourage lane changes.

In order to do so, the autonomous vehicle's computing devices must first detect or predict a traffic stack. For instance, one or more first systems of the autonomous vehicle, such as a perception or planning system, may predict whether a traffic stack exists or is likely to occur when the autonomous vehicle enters an intersection. This may involve receiving behavior predictions as well as occlusion information for other road users (e.g., other vehicles) and traffic density detected by the autonomous vehicle's perception system. These behavior predictions may provide a distribution of potential future locations and other characteristics for each of the detected road users.

The one or more first systems may use the behavior predictions as well as occlusion information about other road users based on the perceived traffic density to determine whether at least one vehicle in the same lane as the autonomous vehicle immediately in front of the autonomous vehicle will stop before a location beyond the intersection which would allow the autonomous vehicle to pull behind the other vehicle and exit the intersection. In this regard, the one or more first systems may also determine a likelihood of a traffic stack using the predicted trajectory likelihood and uncertainty distributions for each behavior prediction as well as occlusion information about other road users based on the perceived traffic density.

If a traffic stack is predicted, the one or more first systems may send a signal to one or more second systems in order to encourage the autonomous vehicle to perform lane changes. For instance, one or more second systems of the autonomous vehicle, such as a routing system, may receive a signal from the one or more first systems indicating that a traffic stack is predicted. In this regard, the one or more second systems may be configured to generate a route from a current location of the autonomous vehicle to a destination which, as described above, may be used by the perception or planning system to generate the aforementioned trajectories. In response to receiving the signal, the one or more second systems of the autonomous vehicle may modify the costs of effecting a lane change. For example, the one or more second systems may plan a plurality of routes by searching over nodes and edges in a road graph between a current location of the autonomous vehicle and a destination. Each edge may include an associated cost. In order to select one or more routes, the one or more second systems may sum the costs of the edges in each route and select the one or more routes with the lowest cost.

Thus, in order to encourage a lane change, in response to receiving the signal, the costs of any edges in the roadgraph between the autonomous vehicle and the traffic stack may be adjusted. The adjustment may be based on a fixed value, an exponentially decaying cost with respect to the predicted/observed length of a traffic stack, a heuristic or learned cost as a function of the situation. Thus, with all else being equal, the increase in costs may effectively encourage the autonomous vehicle to change lanes.

The one or more second systems may then use the roadgraph and adjusted costs to determine one or more new routes as described above. The one or more new routes may then be published to other systems of the autonomous vehicle, including the one or more first systems. In this regard, the one or more first systems may use the one or more new routes to generate new trajectories. As with the one or more second systems, the one or more first systems may generate trajectories using a cost analysis to select a route for the autonomous vehicle to follow. This may involve selecting a trajectory that does or does not result in a lane change; however, due to the adjusted costs used by the one or more second systems, the trajectory may be implicitly biased towards a lane change because of the predicted traffic stack.

The features described herein may enable an autonomous vehicle to respond to traffic stacks and in particular at intersections. For instance, a traffic stack is predicted, the autonomous vehicle's computing devices may take action to encourage lane changes. By encouraging lane changes as described herein, the autonomous vehicle may be better able to avoid being stopped behind a traffic stack within an intersection. This, in turn, may enable the autonomous vehicle to make greater forward progress in certain areas, such as dense intersection traffic which can be typical in dense urban and other environments.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 170 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
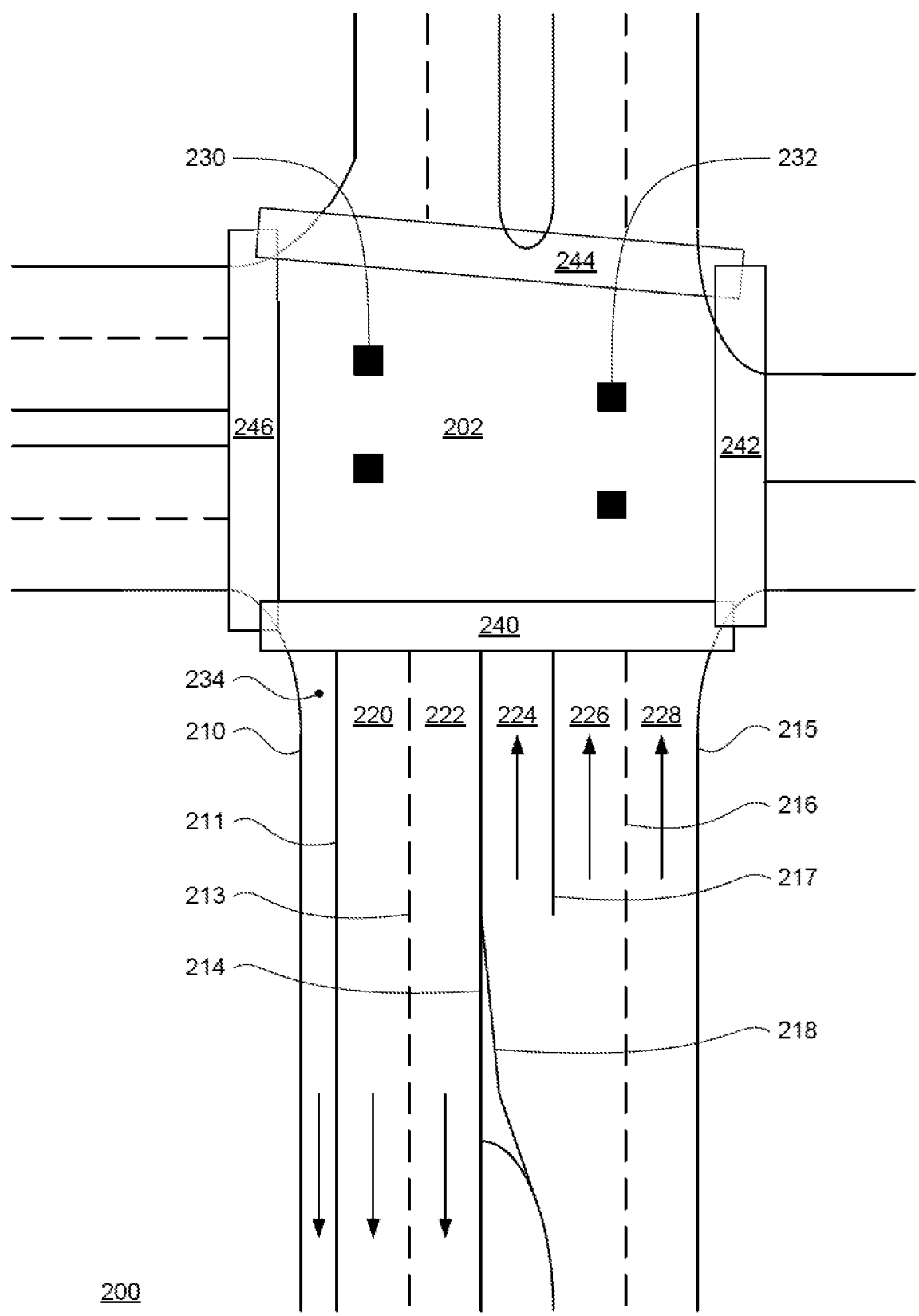
FIGS. 2A-2B are an example of map information in accordance with aspects of the disclosure.
Figure 2B:
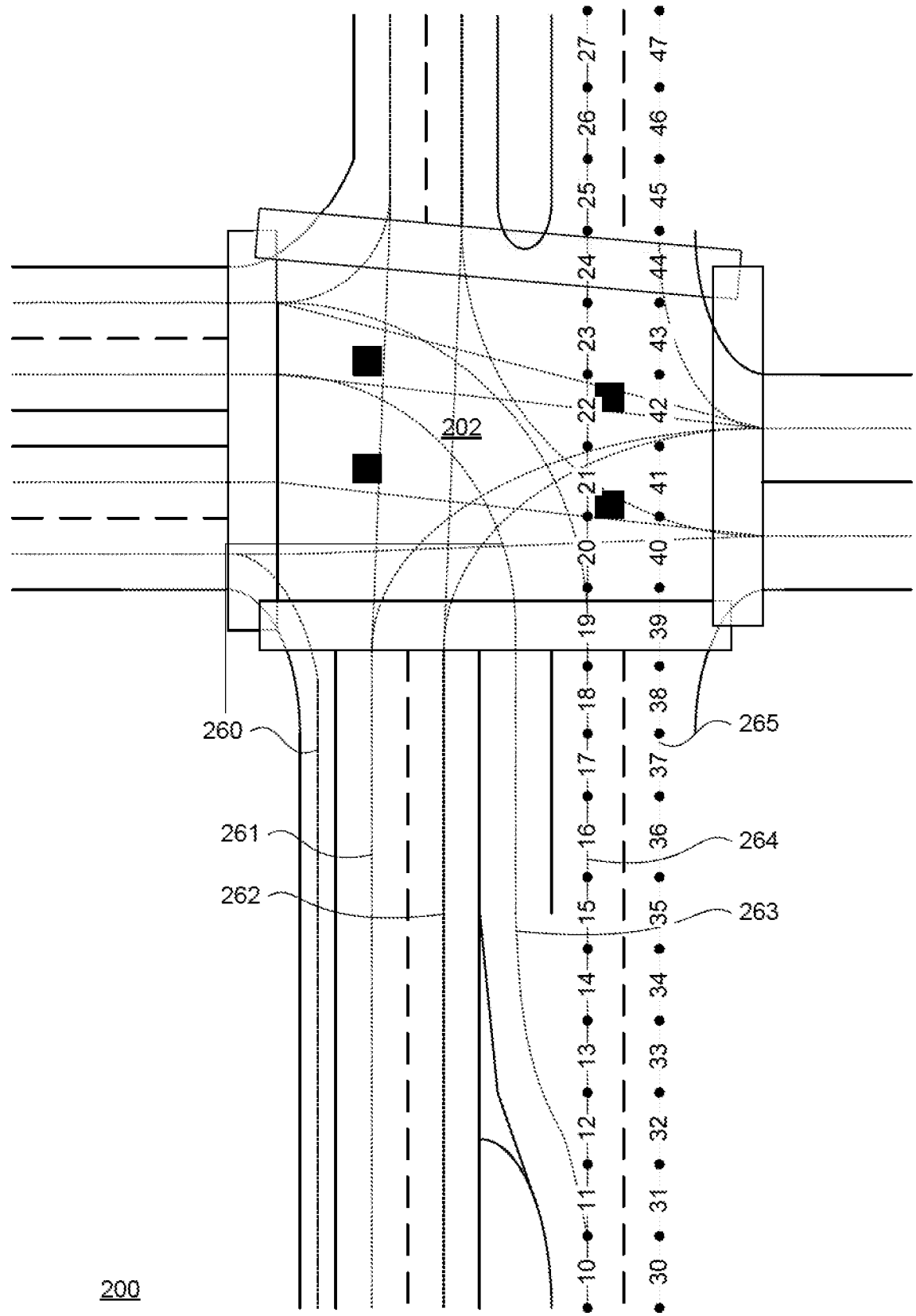

FIGS. 2A and 2B is an example of map information 200 for a small section of roadway including intersection 202. FIG. 2A depicts a portion of the map information 200 that includes information identifying the shape, location, and other characteristics of lane markers or lane lines 210, 211, 213, 214, 215, 216, 217, 218 which define the boundaries of lanes 220, 222, 224, 226, 228, as well as shoulder area 434. In this regard, some areas which may not necessarily be lanes (for example shoulder areas) may be identified as drivable areas (for example, lanes). In this example, the map information also includes other features of intersection 202 such as traffic control devices including traffic signal lights 230, 232, as well as crosswalk areas 240, 242, 244, 246. In addition to the aforementioned features and information, the map information may also include information that identifies the direction of traffic for each lane (represented by arrows in FIG. 2A) as well as information that allows the computing devices 110 to determine whether the vehicle has the right of way to complete a particular maneuver (for example, complete a turn or cross a lane of traffic or intersection).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same driving lane or changing driving lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

FIG. 2B includes a few example representations (not all) of the aforementioned nodes and edges corresponding to a portion of the map information 200. These nodes, when linked together, may form paths within lanes that the autonomous vehicle can follow to correctly position itself within a lane and/or through an intersection (e.g., intersection 202). As shown in FIG. 2B, paths 260, 261, 262, 263, 264, 265 are represented by dashed lines. Each of these paths corresponds to a respective lane or shoulder area. For example, path 260 corresponds to shoulder area 234, path 261 corresponds to lane 220, path 262 corresponds to lane 222, path 263 corresponds to lane 224, path 264 corresponds to lane 226, and path 265 corresponds to lane 228.

These paths may be formed by following edges between nodes in the aforementioned roadgraph. As an example, an edge may correspond to a segment of drivable road surface. For instance, as shown in FIG. 2B, a plurality of edges 10-27 and 30-47 are depicted. In this example, edges 10-27 represent a portion of path 264 and edges 30-47 represent a portion of path 265. While only a few edges are depicted, this is merely for clarity and ease of understanding. Each mapped drivable road surface (e.g., lanes, shoulder areas, parking lots, etc.) may be associated with nodes and edges in the roadgraph. Moreover, the edges are depicted herein as being relatively large for ease of representation; the edges in the roadgraph may range from a few centimeters to a few meters as noted above. Each of these edges has an overlapping starting and/or end node with adjacent edges depending upon the direction of the lane to which the edge corresponds. For example, the ending node of edge 10 is the starting node of edge 11, the ending node of edge 11 is the starting node of edge 12, etc. The ending node of edge 30 is the starting node of edge 31, the ending node of edge 31 is the starting node of edge 32, etc. And so on.

The routing system 170 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. For example, each individual edge in the roadgraph may be associated with a cost. These costs may be summed together with or without additional costs (e.g., additional costs for maneuvers or convenience, etc.) in order to determine the overall cost of a particular route. When multiple routes are generated, the route with the lowest overall cost may be selected by the routing system and published to the various other systems of the autonomous vehicle. For example, between a route with a large number of intersections with traffic controls (such as stop signs or traffic signal lights) versus one with no or very few traffic controls, the latter route may have a lower cost (e.g., because it is faster) and therefore be preferable. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual driving lanes, but also the nature of driving and bicycle lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes.

Positioning system 170-172 may be used by computing devices 110 in order to determine the vehicle's relative or absolute position on a map or on the earth. For example, the positioning system 170-172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
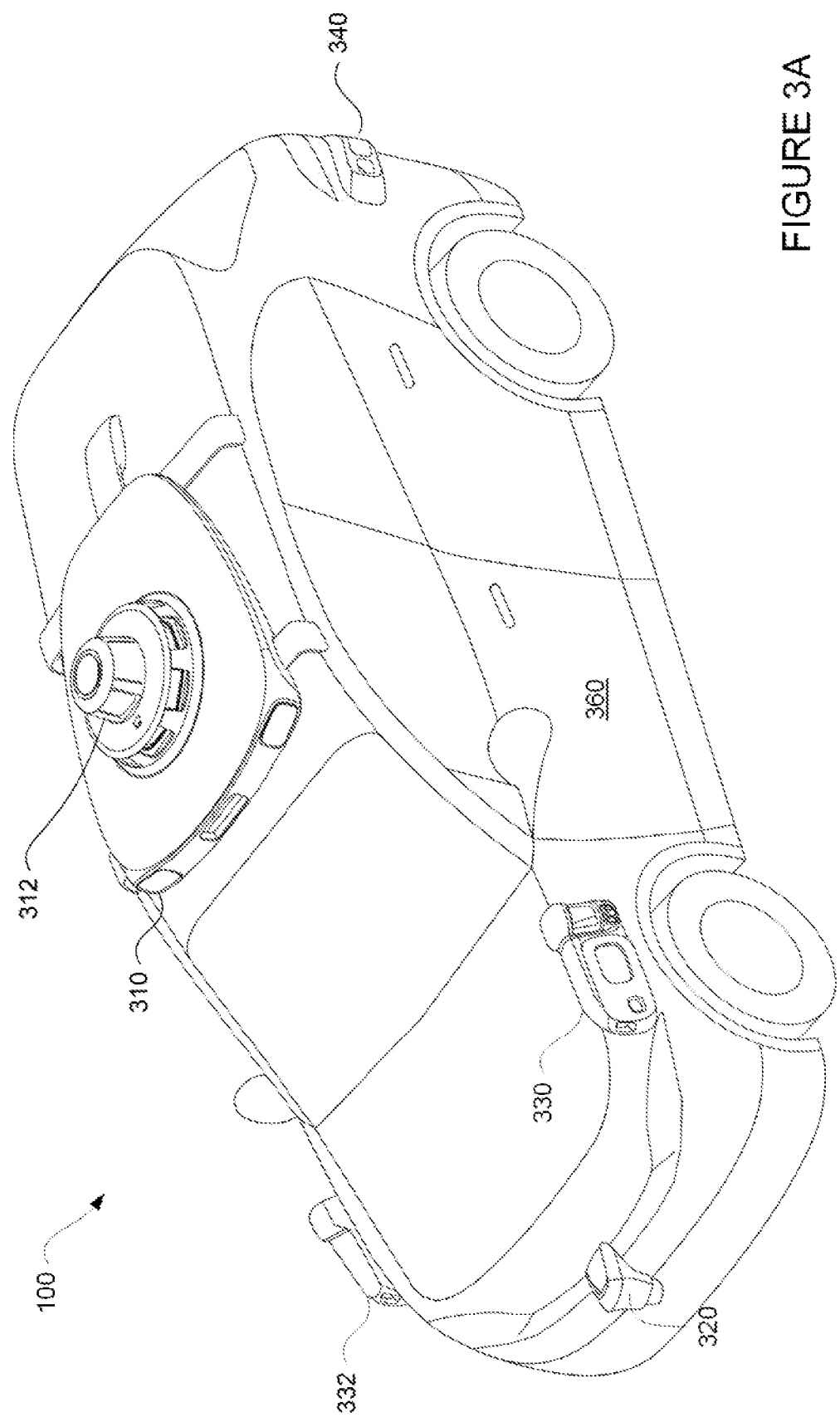
FIGS. 3A-3B are example external views of a vehicle in accordance with aspects of the disclosure.
Figure 3B:
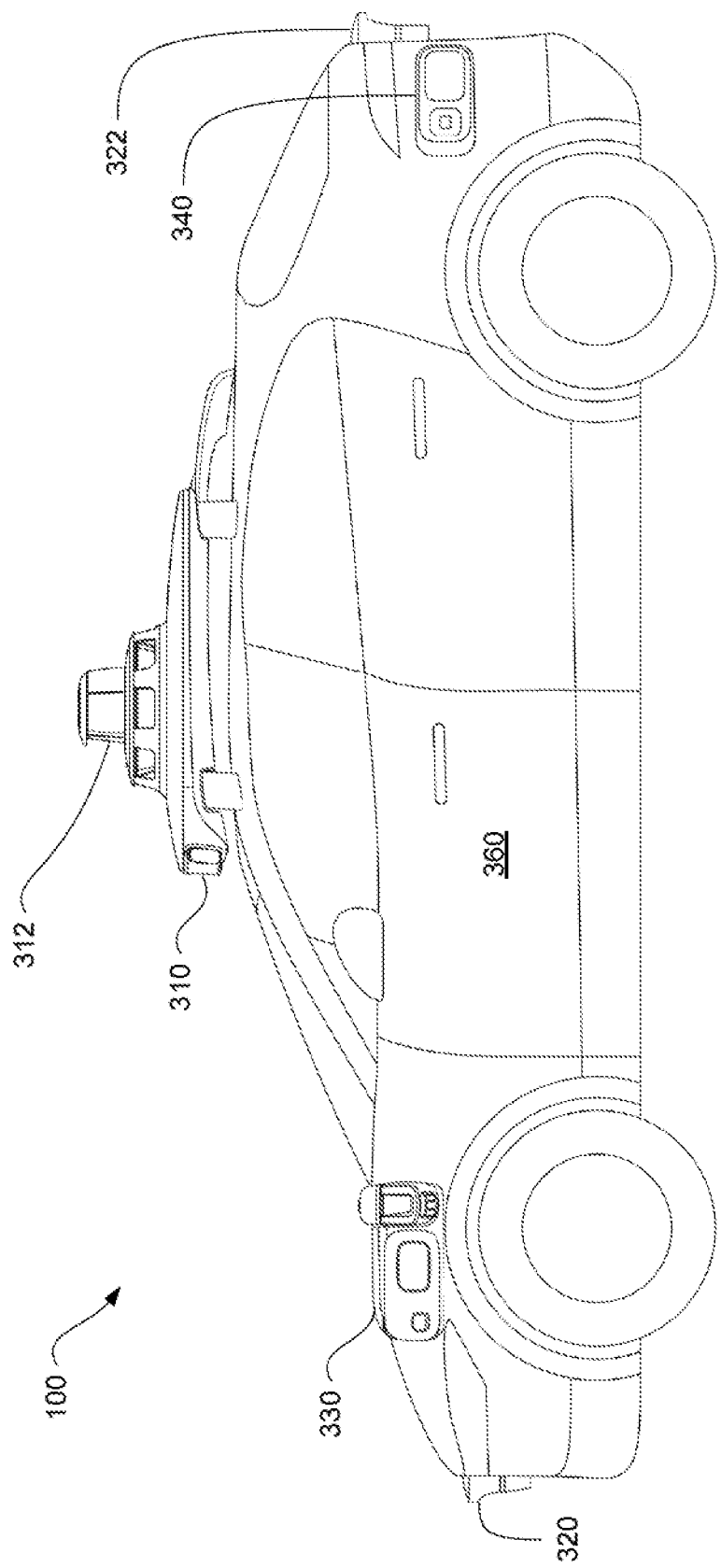

For instance, FIGS. 2 and 3 are a example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170.

A similar process as described above with regard to assessing costs of routes may be used for computing costs of and selecting trajectories by the planning system 168. In other words, during a planning iteration, the planning system may generate a plurality of potential trajectories. The costs of each edge of a potential trajectory may be summed together with or without additional costs (e.g., additional costs for maneuvers or convenience, etc.) in order to determine the overall cost of the potential trajectory. The lowest cost potential trajectory may then be selected by the planning system as the next trajectory for the autonomous vehicle to follow.

Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 172 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
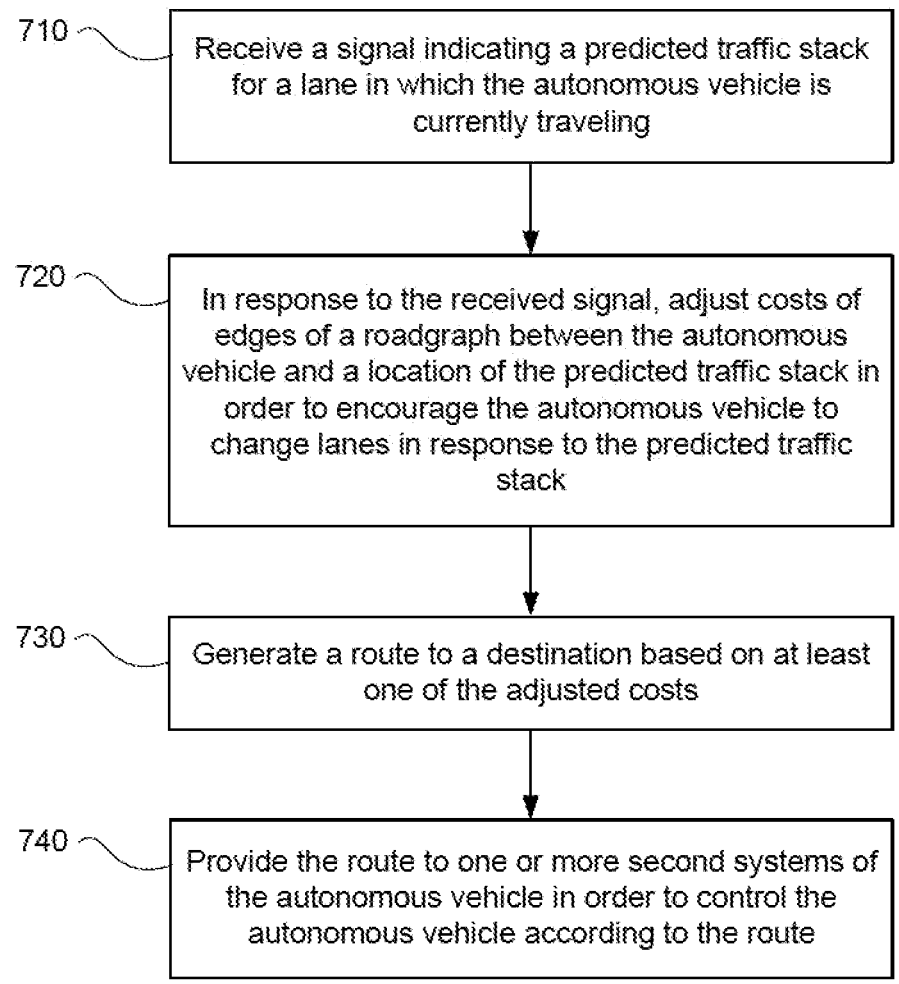
FIG. 7 is an example flow diagram in accordance with aspects of the disclosure.

FIG. 7 provides an example flow diagram 700 for controlling an autonomous vehicle, which may be performed by one or more processors, such as the one or more processors of the computing devices 110 and/or the planning system 168. As shown in block 710, a signal indicating a predicted traffic stack for a lane in which the autonomous vehicle is currently traveling is received.

For instance, one or more first systems of the autonomous vehicle, such as a perception system 174 or planning system 168, may predict whether a traffic stack exists or is likely to occur when the autonomous vehicle enters an intersection. This may involve receiving behavior predictions as well as occlusion information for other road users (e.g., other vehicles) and traffic density detected by the autonomous vehicle's perception system. The behavior predictions may be provided as a series of probability distributions over time. The first probability distribution in the series may identify locations where an object (e.g., another road user) is predicted to be at time t, the next probability distribution may identify locations where the object is predicted to be at a time t+Δt, the next probability distribution may identify locations where the object is predicted to be at a time t+2*Δt, and so on. Each probability distribution may be a "density" spread over all the locations that the object could be in at each of those times, with higher density values indicating higher likelihood locations. From this, at each future time, the computing devices 110 can calculate a total probability distribution for whether the object's location will be beyond a threshold location D. This threshold location D may be defined as a location such that if the object passes this threshold location, the autonomous vehicle 100 will be able to exit the intersection when the traffic signal light turns red. Mathematically, each total probability may be defined as an integral from minus infinity to the threshold location D of the probability distribution. In some instances, the distribution of locations may be represented as a mixture of Gaussians. Known tables for Gaussian integrals that can be used to get an accurate value. In this regard, the computing device 110 may use the total probability for a future time R when the traffic signal light is expected to turn red to estimate the probability of the object being before the threshold location D at that time. This value may then be considered the likelihood of a traffic stack at the intersection.

The occlusion information may be tracked by the perception system 174 or another occlusion system, which takes the output of the perception system 174 (e.g., perception information) as input in order to estimate the locations of occluded road users. This occlusion information may include predicted information about vehicles which were detected by the perception system but thereafter have become occluded. For example, if the perception system 174 has detected three vehicles in front of the autonomous vehicle on an uphill grade, and the closest is a bus, when the autonomous vehicle reaches a more level road surface, the other two vehicles in front of the bus may not be able to be observed and tracked by the perception system. As such, at this point, the other two vehicles are occluded. However, by predicting that the other two vehicles have not left that lane, the perception system and/or a distinct occlusion system may output occlusion information or location and speed estimates for the two occluded vehicles based on prior observations of the two vehicles. For example, because the perceptions system, which also tracks vehicles in adjacent lanes, does not identify any vehicles moving into these adjacent lanes, the perception system and/or occlusion system may output estimates for the two vehicles in front of the bus with an estimated location and speed, even when the perception system cannot currently perceive the two vehicles.

Traffic density may be derived from perception information. As an example, the traffic density may identify how many vehicles the perception system has perceived in the autonomous vehicle's current lane and/or adjacent lanes.

The one or more first systems may use the behavior predictions as well as occlusion information about other road users based on the perceived traffic density to determine whether at least one vehicle in the same lane as the autonomous vehicle immediately in front of the autonomous vehicle will stop before a location beyond the intersection which would allow the autonomous vehicle to pull behind the other vehicle and exit the intersection. In this regard, the one or more first systems may also determine a likelihood of a traffic stack using the predicted trajectory likelihood and uncertainty distributions for each behavior prediction as well as occlusion information about other road users based on the perceived traffic density. In other words, a traffic stack may be predicted when another vehicle (i.e., the last vehicle in a traffic stack) in front of the autonomous vehicle is predicted to be likely (i.e., to at least some minimum threshold likelihood value) to stop in a location that will not leave enough room for the autonomous vehicle to exit the intersection.

As indicated above, this predicting could also include estimating when a traffic signal turns from red to yellow in order to avoid stopping in an intersection when the light is red or alternatively, the autonomous vehicle's computing systems could attempt to avoid stopping in intersections altogether. For the former case, the yellow to red transition time may be estimated using traffic engineering formulas or logged data for each intersection. This in turn may be used to narrow down the times for which the autonomous vehicle should not stop in the intersection. Additional and more complex approaches may also be used to predict traffic stacks. For example, machine-learned models which use map information, temporal information (e.g., based on logged observations or other data, traffic stacks at this location or generally may be more likely between 4 and 6 pm, and much less likely at 10 pm), occlusion information and the behavior predictions to output a prediction of a location (e.g., a starting position) of a traffic stack in a particular lane may be used. Such machine learned models may also output a likelihood of a predicted traffic stack. In this regard, if the likelihood is greater than a threshold value, the one or more first systems may predict a traffic stack.

In addition, or alternatively, machine learned models may be used to predict whether a given road user is "passable", "impassable", and "unsure". Different features contribute to whether an agent is passable, such as the agent type (bus, large vehicle, motorcyclist, etc.), the vehicle's motion state (stationary vs. moving), and other perception annotations (unparking, double parked, parallel parking, etc.). Road users that are determined to be passable may be indicative of a stopped vehicle which can be nudged or otherwise driven around (and may be less of a concern for blocking an intersection), whereas those that are determined to be impassable should be yielded to as early as possible to avoid blocking the intersection. For agents classified as unsure, the autonomous vehicle may, in some instances, adjust its location (e.g., move slightly into the intersection) to get a better field of view for the autonomous vehicle's perception system in order to improve the likelihood of classifying the agent as passable or impassable.

In the case that other road users in the autonomous vehicle's lane are highly occluded, the autonomous vehicle's computing devices may predict whether there is a traffic stack according to the traffic in the adjacent lanes. For example, a bus in front of an autonomous vehicle may completely block the perception system's view of all the vehicles in front of the bus. Thus, the autonomous vehicle's computing devices may be unable to directly detect if there is a traffic stack in front of the bus. However, if there is a traffic stack in one or more adjacent lanes, and the bus is slowing down or moving relatively slowly (i.e., as compared to the speed limit), the autonomous vehicle's computing devices may predict a traffic stack is located in front of the bus as well.

Figure 4:
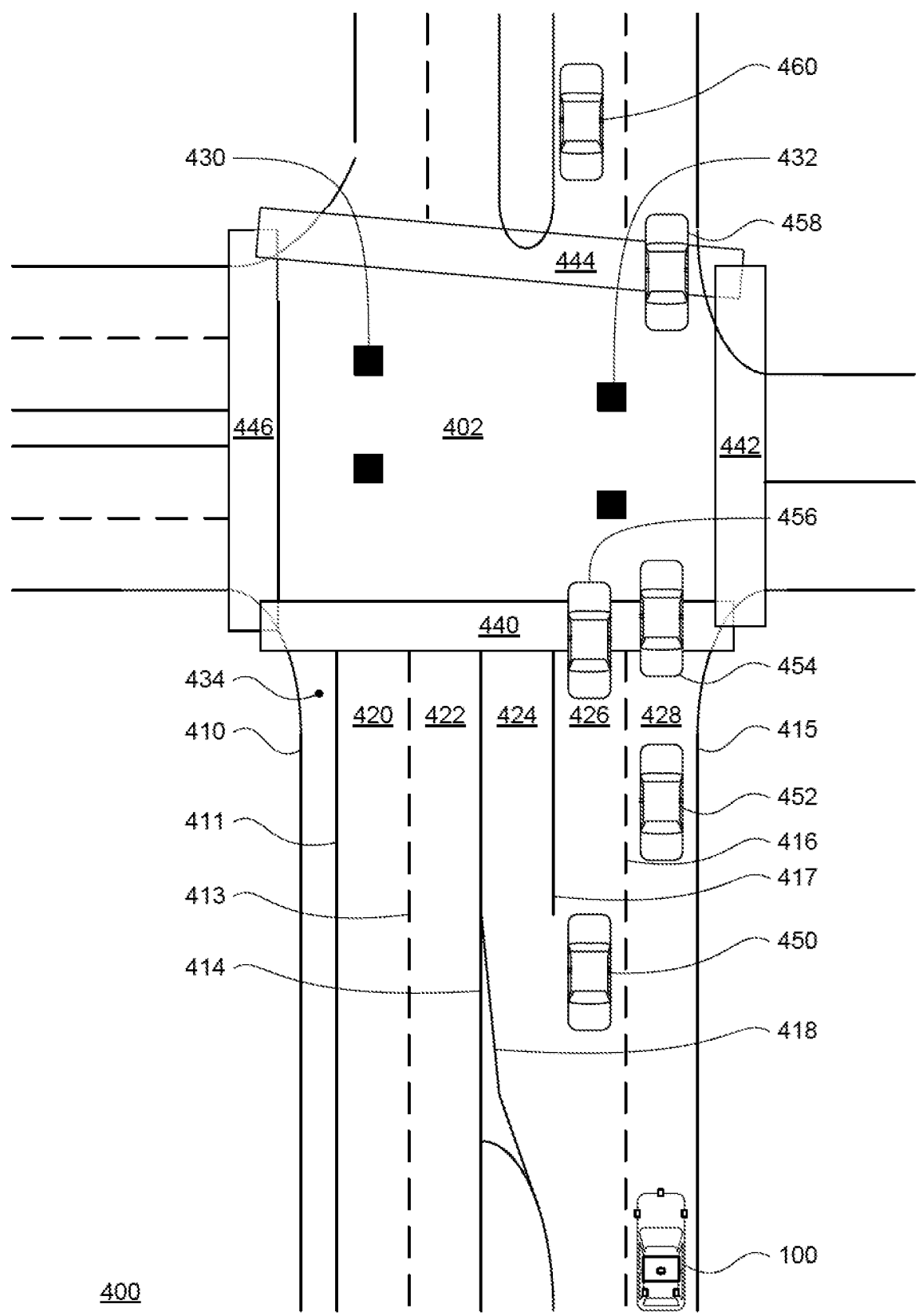
FIG. 4 is an example of a geographic area, autonomous vehicle and other road users in accordance with aspects of the disclosure.

For example, FIG. 4 is an example of the autonomous vehicle 100 driving on a section of roadway or geographic area 400 corresponding to the map information 200. In this example, the shape, location, and other characteristics of intersection 202, lane markers or lane lines 210, 211, 213, 214, 215, 216, 217, 218, lanes 220, 222, 224, 226, 228, shoulder area 234, traffic signal lights 230, 232, crosswalk areas 240, 242, 244, 246, etc. correspond to the shape, location, and other characteristics of intersection 402, lane markers or lane lines 410, 411, 413, 414, 415, 416, 417, 418, lanes 420, 422, 424, 426, 428, shoulder area 434, traffic signal lights 430, 432, crosswalk areas 440, 442, 444, 446, etc., respectively. In this example, the autonomous vehicle is traveling in lane 428 approaching intersection 402. The perception system 174 has also detected a plurality of other road users 450, 452, 454, 456, 458, 460.

Figure 5:
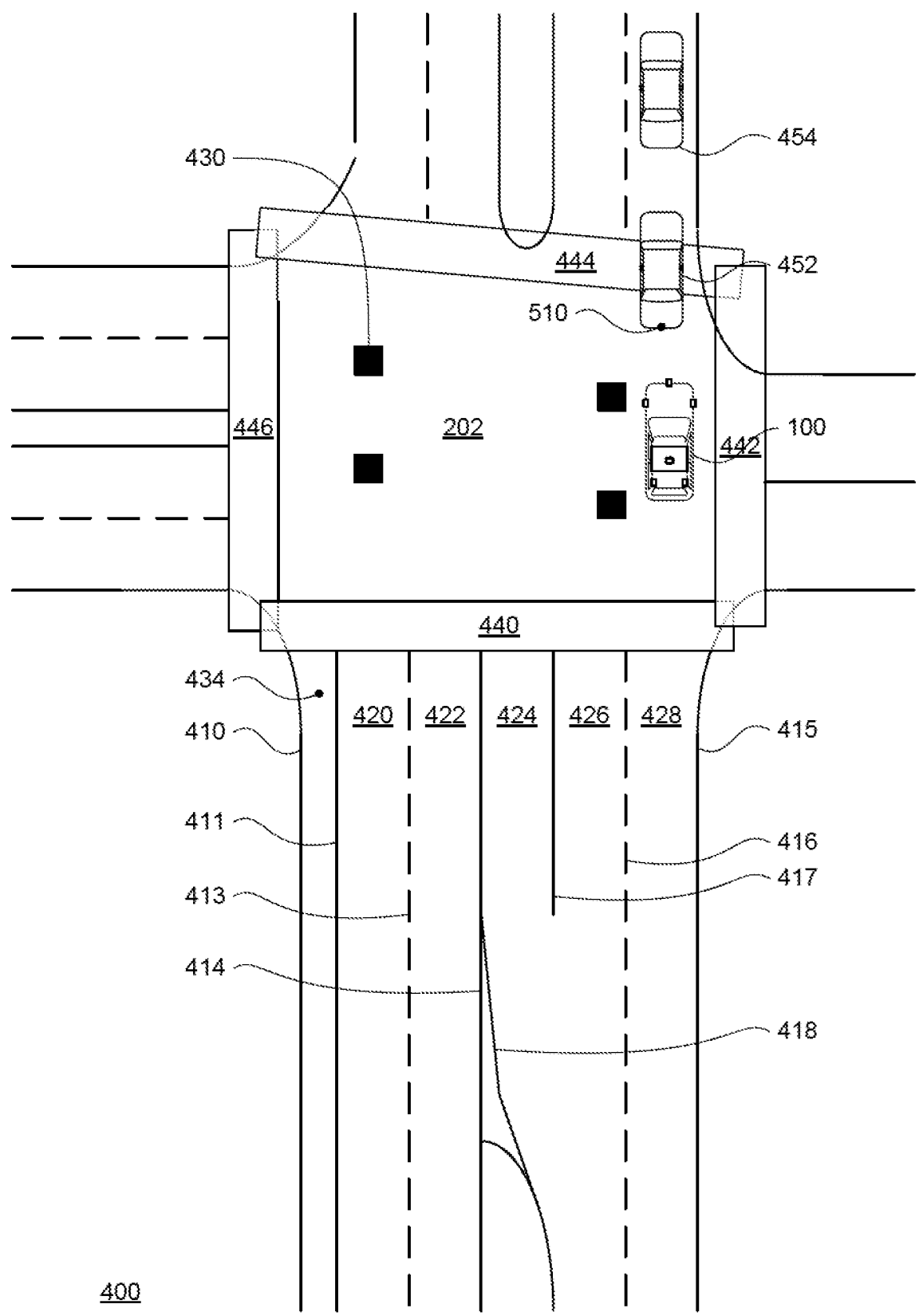
FIG. 5 is an example of a geographic area, autonomous vehicle and predicted locations of other road users in accordance with aspects of the disclosure.

FIG. 5 provides an example of behavior predictions for the plurality of other road users 450, 452, 454, 456, 458, 460 at a future point in time. In this example, the autonomous vehicle 100 has moved closer to the intersection 402. Road users 450, 456, 458, 460 have moved beyond geographic area 400, and therefore are not depicted. In addition, road user 452 is stopped or very slowly moving within the intersection 402/202. In this regard, the autonomous vehicle 100 may not be able to proceed through the intersection, but may end up stopping in the intersection 402 behind road user 452 (as depicted in FIG. 5). As such, the perception system 174 or planning system 168 may predict a traffic stack in lane 428 (or lane 228 of the map information 200). In this example, the prediction of the traffic stack may indicate that the traffic stack starts at location 510.

If a traffic stack is predicted, the one or more first systems may send a signal to one or more second systems in order to encourage the autonomous vehicle to perform lane changes. For instance, returning to the example of FIG. 5, the one or more second systems of the autonomous vehicle, such as the routing system 170, may receive a signal from the one or more first systems (e.g., perception system 174 or planning system 168) indicating that a traffic stack is predicted. This traffic stack may begin at the location of the road user 452. In this regard, the one or more second systems, being a routing system 170, may be configured to generate a route from a current location of the autonomous vehicle to a destination which, as described above, may be used by the perception or planning system to generate the aforementioned trajectories.

Returning to FIG. 7, at block 720, in response to the received signal, costs of edges of a roadgraph between the autonomous vehicle and a location of the predicted traffic stack are adjusted in order to encourage the autonomous vehicle to change lanes in response to the predicted traffic stack. For instance, in response to receiving the signal, the one or more second systems of the autonomous vehicle may modify the costs of effecting a lane change. For example, as noted above with regard to the routing system 170, the one or more second systems may plan a plurality of routes by searching over nodes and edges in a road graph between a current location of the autonomous vehicle and a destination. Each edge may include an associated cost. In order to select one or more routes, the one or more second systems may sum the costs of the edges in each route and select the one or more routes with the lowest cost as described above.

Thus, in order to encourage a lane change, in response to receiving the signal, the costs of any edges in the roadgraph between the autonomous vehicle and the traffic stack (i.e., the vehicle immediately in front of the autonomous vehicle), may be adjusted (e.g., increased). The adjustment may be based on a fixed value, an exponentially decaying cost with respect to the predicted/observed length of a traffic stack, a heuristic or learned cost as a function of the situation (e.g., time of day, location, maneuver type, traffic density, expected or known traffic light duration for the next intersection, etc.). Costs of additional edges in the same lane beyond the last vehicle in the traffic stack may also be adjusted (e.g., increased), for example, when the one or more first systems are able to detect a plurality of vehicles in the traffic stack. These edges may also include those that correspond to the lane in which the autonomous vehicle is currently traveling, as opposed to adjacent lanes. Thus, with all else being equal, the increase in costs may effectively encourage the autonomous vehicle to change lanes.

Figure 6:
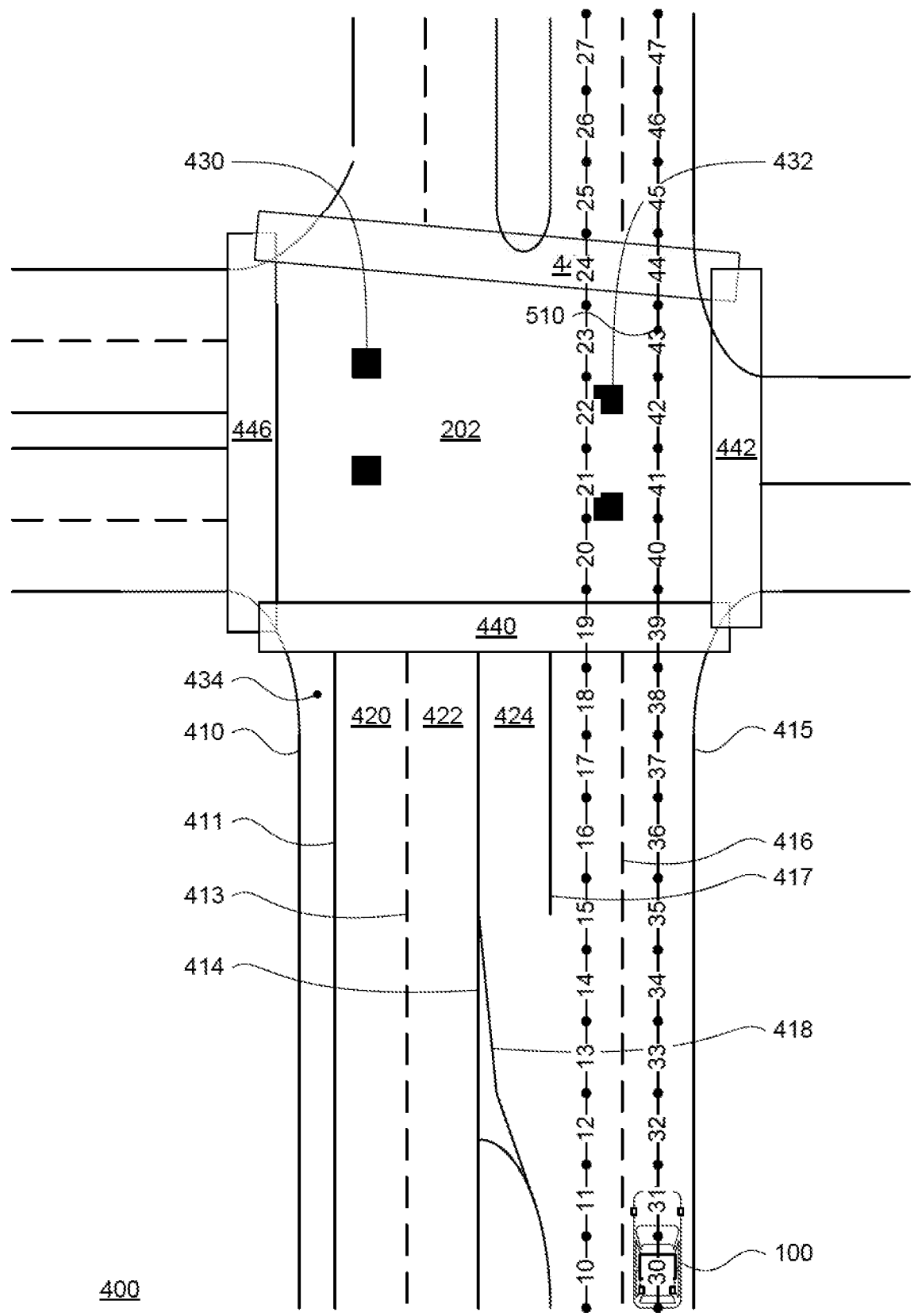
FIG. 6 is an example of a geographic area, autonomous vehicle, start of a traffic stack and edges in accordance with aspects of the disclosure.

Turning to FIG. 6, the edges of map information 200 are depicted with regard to the geographic area 400, the location of the autonomous vehicle (from FIG. 4), as well as the location 510 (where the traffic stack is predicted to begin). In this example, edges 31-43 are between the location of the autonomous vehicle 100 and the location 510. As such, the cost of each of the edges 31-43 may be adjusted, e.g., increased when determining one or more routes as described above. In some instances, edges 44 and beyond may also be adjusted. Thus, all else being equal, the costs of edges 31-43 may be greater than the costs of edges 11-23, respectively.

The amount of the adjustment may be determined manually by observation and simulation in order to increase the likelihood of lane changes while avoiding situations in which dramatic increases in the costs result in the autonomous vehicle changing lanes in a detrimental way. Examples of such may include missing a turn or exit which dramatically increases the time to destination, results in the autonomous vehicle leaving a service area, or results in the autonomous vehicle stranded or unable to make forward progress.

Returning to FIG. 7, at block 730, a route to a destination is generated based on at least one of the adjusted costs. At block 740, the route is provided to one or more second systems of the autonomous vehicle in order to control the autonomous vehicle according to the route. The one or more second systems may then use the roadgraph and adjusted costs to determine one or more new routes as described above. For example, the routing system 170 may use the adjusted costs of the edges 31-43 to determine the overall cost of any routes that include such edges. This may effectively encourage, the routing system selecting a route that includes a lane change which may cause the autonomous vehicle 100 to change from lane 428 to lane 426. However, if the autonomous vehicle needed to make a right turn at intersection 402 to reach a destination within a reasonable amount of time, even with the increased costs, the routing system 170 may be more likely to select a route that avoid changing lanes if the cost of missing the turn or rather the cost of following a different route without the turn would be higher (e.g., because the route without the turn is much longer in terms of time and or distance). Thus, the aforementioned adjustments to the costs may implicitly bias the autonomous vehicle towards lane changes when traffic stacks are predicted. In other words, the adjustments to the costs may effectively encourage, though may not always result in, lane changes thereby improving the efficiency of the autonomous vehicle.

The one or more new routes may then be published to other systems of the autonomous vehicle, including the one or more first systems. In this regard, the one or more first systems may use the one or more new routes to generate new trajectories. As with the one or more second systems, the one or more first systems may generate trajectories using a cost analysis to select a trajectory for the autonomous vehicle to follow. This may involve selecting a trajectory that does or does not result in a lane change; however, due to the adjusted costs used by the one or more second systems, the trajectory may be implicitly biased towards a lane change because of the predicted traffic stack.

In some instances, traffic stacks may also be predicted or detected in one or more adjacent lanes by the one or more first systems. In such situations, a signal may be sent to the one or more second systems which may adjust the costs of edges in the adjacent lane as well. Again, the one or more second systems may then use the roadgraph and adjusted costs to determine one or more new routes as described above. The one or more new routes may then be published to other systems of the autonomous vehicle, including the one or more first systems. In this regard, the one or more first systems may use the one or more new routes to generate new trajectories.

In such instances, the one or more first systems may also analyze which of the lanes has a "worse" traffic stack and provide corresponding signals to the one or more second systems. This may be based on the likelihood values for each traffic stack, traffic density in each lane, stopping distance (e.g., from the edge/exit of the intersection or the estimated stopping location of the autonomous vehicle), estimating the probability of being stuck in the traffic intersection or rather the likelihood of each predicted traffic stack, etc. In this regard, the costs of the edges in the "worse" lane may be increased by the one or more second systems by a greater value than the costs of the edges in any other lanes.

For example, regarding the stopping distance, if a traffic stack in a first lane allows the autonomous vehicle to stop closer to the intersection exit, this may be a more attractive, preferred, or less-worse option than a traffic stack in a second lane that forces the autonomous vehicle to stop in the middle of the intersection, blocking traffic.

As another example assuming predicted traffic stacks are generally the same for two lanes, if a first lane is in dense traffic that is moving more slowly, and a second lane has traffic that is making more progress, the first lane may be a less attractive, less preferred or worse option that the second lane which may be a more attractive, preferred or less-worse option.

As another example assuming predicted traffic stacks are generally the same for two lanes, if a first lane has a higher likelihood of a traffic stack than a second lane, the first lane may be a less attractive, less preferred or worse option that the second lane which may be a more attractive, preferred or less-worse option.

As another example assuming predicted traffic stacks are generally the same for two lanes, if a first lane will lead the autonomous vehicle out of a service area and a second lane would not, the first lane may be a less attractive, less preferred or worse option that the second lane which may be a more attractive, preferred or less-worse option.

As another example assuming predicted traffic stacks are generally the same for two lanes, if a first lane will increase an estimated time of arrival for the autonomous vehicle (e.g., at a pickup or drop off location or other destination) than a second lane, the first lane may be a less attractive, less preferred or worse option that then second lane which may be a more attractive, preferred or less-worse option.

As another example assuming predicted traffic stacks are generally the same for two lanes, if a first lane will lead the autonomous vehicle on a route which requires complex maneuvers (e.g., U-turns, K- or three-point turns, unprotected left turns, etc.) and second lane would not, the first lane may be a less attractive, less preferred or worse option that then second lane which may be a more attractive, preferred or less-worse option.

The features described herein may enable an autonomous vehicle to respond to traffic stacks and in particular at intersections. For instance, a traffic stack is predicted, the autonomous vehicle's computing devices may take action to encourage lane changes. By encouraging lane changes as described herein, the autonomous vehicle may be better able to avoid being stopped behind a traffic stack within an intersection. This, in turn, may enable the autonomous vehicle to make greater forward progress in certain areas, such as dense intersection traffic which can be typical in dense urban and other environments.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method for controlling an autonomous vehicle, the method comprising:
   receiving, by one or more processors of one or more first systems of the autonomous vehicle, a first signal indicating a first predicted traffic stack for a first lane in which the autonomous vehicle is currently traveling;
   receiving, by the one or more processors, a second signal indicating a second predicted traffic stack in a second lane adjacent to the first lane;
   in response to the received first signal or the received second signal, adjusting, by the one or more processors, costs of edges of a roadgraph based on which of the first predicted traffic stack or the second predicted traffic stack is a worse traffic stack, wherein the costs include costs of first edges between the autonomous vehicle and a location of the first predicted traffic stack or costs of second edges of the roadgraph between the autonomous vehicle and a location of the second predicted traffic stack;
   generating, by the one or more processors, a route to a destination based on the adjusted costs; and
   providing, by the one or more processors, the route to one or more second systems of the autonomous vehicle in order to control the autonomous vehicle according to the route.

2. The method of claim 1, wherein the first or second predicted traffic stack is located at an intersection.

3. The method of claim 1, wherein the one or more first systems is a planning system of the autonomous vehicle configured to generate trajectories according to the route for the autonomous vehicle to follow.

4. The method of claim 1, wherein the one or more second systems include a routing system of the autonomous vehicle configured to generate the route.

5. The method of claim 1, wherein adjusting the costs includes increasing the costs.

6. The method of claim 1, wherein the first edges correspond to the first lane and the second edges correspond to the second lane.

7. The method of claim 1, wherein the first and second predicted traffic stacks are based on behavior predictions of other road users and occlusion information of the other road users, and the occlusion information includes information about at least one other road user that was detected by the one or more first systems and subsequently became occluded from the one or more first systems.

8. The method of claim 1, wherein the second signal further indicates which of the first predicted traffic stack and the second predicted traffic stack is the worse traffic stack, and the adjusting is further based on which of the predicted traffic stack and the second predicted traffic stack is the worse traffic stack.

9. A system for controlling an autonomous vehicle, the system comprising one or more processors configured to:
   receive a first signal indicating a first predicted traffic stack for a first lane in which the autonomous vehicle is currently traveling;
   in response to the received first signal, adjust first costs of first edges of a roadgraph between the autonomous vehicle and a location of the first predicted traffic stack in order to encourage the autonomous vehicle to change lanes in response to the first predicted traffic stack;
   before, during, or after receipt of the first signal, receive a second signal indicating a second predicted traffic stack in a second lane adjacent to the first lane, wherein the second signal further indicates which of the first predicted traffic stack and the second predicted traffic stack is a worse traffic stack;
   in response to the received second signal, adjust second costs of second edges of the roadgraph in the second lane;
   adjust the first edges and the second edges further based on which of the first predicted traffic stack and the second predicted traffic stack is a worse traffic stack;
   generate a route to a destination based on at least one of the adjusted first costs and based on at least one of the adjusted second costs; and
   provide the route to one or more second systems of the autonomous vehicle in order to control the autonomous vehicle according to the route.

10. The system of claim 9, wherein the first or second predicted traffic stack is located at an intersection.

11. The system of claim 9, wherein the system is a planning system of the autonomous vehicle configured to generate trajectories according to the route for the autonomous vehicle to follow.

12. The system of claim 9, further comprising the one or more second systems, wherein the one or more second systems include a routing system of the autonomous vehicle configured to generate the route.

13. The system of claim 9, wherein the one or more processors are further configured to adjust the first or second costs includes increasing the first or second costs.

14. The system of claim 9, wherein the first edges correspond to the first lane and the second edges correspond to the second lane.

15. The system of claim 9, wherein the first and second predicted traffic stacks are based on behavior predictions of other road users and occlusion information of the other road users.

16. An autonomous vehicle comprising:
   memory storing a roadgraph; and
   a planning system comprising one or more processors configured to:
      receive a first signal indicating a first predicted traffic stack for a first lane in which the autonomous vehicle is currently traveling;
      receive a second signal indicating a second predicted traffic stack in a second lane adjacent to the first lane;
      in response to the received first signal or the received second signal, adjust costs of edges of a roadgraph based on which of the first predicted traffic stack or the second predicted traffic stack is a worse traffic stack, wherein the costs include costs of first edges between the autonomous vehicle and a location of the first predicted traffic stack or costs of second edges of the roadgraph between the autonomous vehicle and a location of the second predicted traffic stack;

generate a route to a destination based on at least one of the adjusted costs; and provide the route to one or more second systems of the autonomous vehicle in order to control the autonomous vehicle according to the route.

17. The autonomous vehicle of claim 16, further comprising the one or more second systems.

18. The autonomous vehicle of claim 16, the one or more second systems include a routing system of the autonomous vehicle configured to generate the route.

19. The autonomous vehicle of claim 16 wherein, to adjust the costs, the one or more processors are further configured to:

when the first predicted traffic stack is determined to be the worse traffic stack, increase the costs of the first edges by a value greater than costs of edges in any other lanes; and when the second predicted traffic stack is determined to be the worse traffic stack, increase the costs of the second edges by a value greater than costs of edges in any other lanes.

20. The autonomous vehicle of claim 16, wherein the first and second predicted traffic stacks are based on behavior predictions of other road users and occlusion information of the other road users, and the occlusion information includes information about at least one other road user that was detected and subsequently became occluded.

* * * * *